United States Patent [19]

Hogg

[11] 4,133,065

[45] Jan. 9, 1979

[54] MODULAR BEEHIVE CONSTRUCTION AND COMPONENT THEREFOR

[76] Inventor: John A. Hogg, 2225 S. 36th St., Kalamazoo, Mich. 49053

[21] Appl. No.: 733,011

[22] Filed: Oct. 15, 1976

[51] Int. Cl.² ............................................. A01K 47/00
[52] U.S. Cl. ................................................... 6/1; 6/6
[58] Field of Search .......................................... 6/1–12

[56] References Cited

U.S. PATENT DOCUMENTS

| 35,426 | 5/1862 | Harris | 6/2 R |
|---|---|---|---|
| 80,091 | 7/1868 | Renlogle | 6/2 R |
| 120,885 | 11/1871 | Lewis | 6/1 |
| 152,366 | 6/1874 | Gwaltney | 6/2 R |
| 166,163 | 7/1875 | Vanurder | 6/4 R |
| 217,017 | 7/1879 | Lyons | 6/9 |
| 507,070 | 10/1893 | Hines | 6/2 R |
| 1,036,950 | 8/1912 | Anthony | 6/2 R |

Primary Examiner—Louis G. Mancene
Assistant Examiner—G. Lee Skillington
Attorney, Agent, or Firm—Blanchard, Flynn, Thiel, Boutell & Tanis

[57] ABSTRACT

Modular beehive. For a beehive assembly, there is provided a triangular module having a pair of triangular end members connected by a perforated panel, the perforations in said panel being of such size as to permit the passage therethrough of worker bees but selectively to permit or preclude corresponding passage of the queen bee as desired in a given case. The modules are arranged in alternately facing manner with said perforated panel on the downward side thereof. The alternately exposed sides of said modules are closed by removable imperforate doors. Triangularly shaped comb frames are insertable into said modules and positioned in suitably spaced relationship to each other parallel with and in substantially lateral register with said triangular side members. The comb frames are thus accessible in any modules of the hive without disturbing other modules for removal; inspection and/or replacement as desired. Other desirable features of the hive structure include means minimizing the entry of rodents into the hive, means facilitating the ejection from the hive of dead bees or other refuse, the ready adaptability thereto of known antiswarming features, capacity for assembly if desired with presently conventional beehive components and capacity for assembly in a variety of different ways as may be desired by the beekeeper.

18 Claims, 15 Drawing Figures

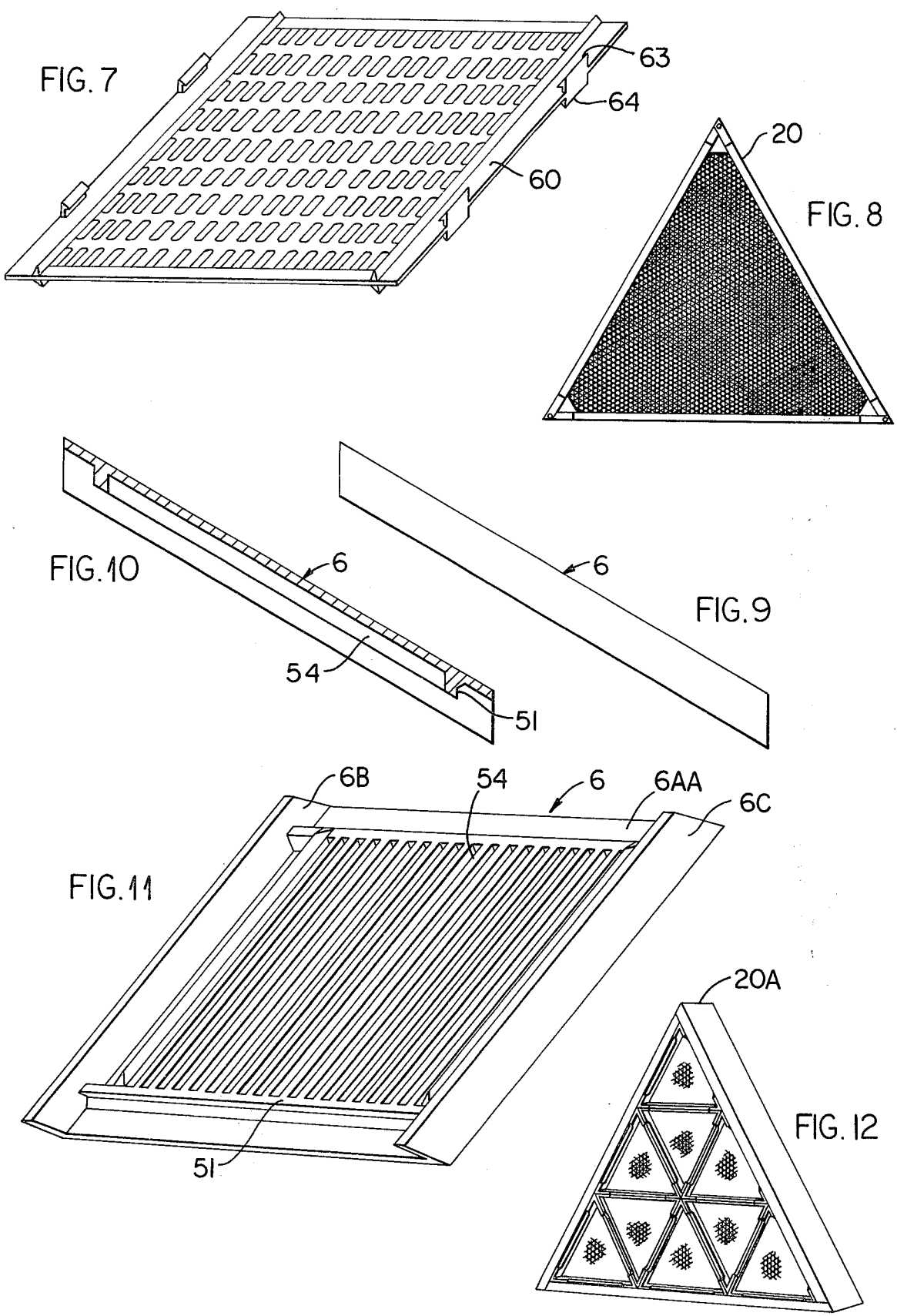

MODULAR BEEHIVE CONSTRUCTION AND COMPONENT THEREFOR

FIELD OF THE INVENTION

The invention relates to beehive construction and contemplates particularly a modular arrangement which in a normal stacking or other arrangement renders the comb frames therein accessible with respect to any hive body without disturbing other hive bodies in the assembly.

BACKGROUND OF THE INVENTION

It is well known that beekeeping is an extremely ancient art and that the hive arrangements used therein have widely variable configurations from one location or time to another. For example, in former times one standard beehive was of such nature as to require complete destruction of the bee colony therein in order to recover the honey. In more modern times, hives have been designed to facilitate continuity of the colony. These latter thus provide for harvesting of both honey and wax without harm to the colony and ensure, according to the judgment of the beekeeper, the preservation to the colony of sufficient living space and honey to enable it to continue in a healthy manner from year to year.

In the development of this latter approach to beekeeping, a wide range of specific hive structures has been proposed from time to time but commercial beekeeping operations have at the present time fairly uniformly settled on the so-called Langstroth hive which hive has been well known for many years. This has in turn been subject to many modifications, such as the Aspinwall anti-swarming hive, but on the whole the Langstroth hive has served well for many years the several functions required for both commercial and hobby beekeeping and today represents, in one or another of its various modifications, the standard hive utilized by beekeepers.

There are, however, a number of disadvantages with the Langstroth hive which have been well known for a long time. Chief among these is the inability to reach the comb frames of any hive body or super, excepting from the top thereof which in each case necessitates the removal of the cover, the inner cover if one is used, and whatever number of supers and/or hive bodies is/are above the super or hive body desired. This not only is time consuming and inconvenient, but it results in excessive disturbance of the bees within whatever components are removed and renders difficult any desired working with the hive structure other than the parts thereof immediately on top. Further, while the number of hive bodies and/or supers may be varied as desired in a Langstroth beehive, its arrangement is otherwise quite inflexible.

Accordingly, the objects of the invention include:

1. To provide a beehive construction of modular nature wherein the modules are each of relatively simple and inexpensive construction but capable of assembly in a wide variety of different ways.

2. To provide a beehive construction, as aforesaid, in which the modules can be arranged in a wide variety of specific relationships but wherein all or most thereof are individually accessible without requiring the disturbance of other modules or of the bees in such other modules.

3. To provide a beehive construction, as aforesaid, in which such modules can be freely used in association with presently standard beehive components such as Langstroth or Aspinwall components, without loss of either efficiency or the attainment of desirable characteristics.

4. To provide a beehive construction, as aforesaid, which can be utilized as desired either for comb honey or for extracted honey.

5. To provide a beehive construction, as aforesaid, which is capable of providing for a wide range of desirable details, such as the inhibition of rodent entry, the maintenance of a hive in a well ventilated and dry condition, the ejection therefrom of dead bees and other debris, the incorporation thereinto of Aspinwall anti-swarming features together with other advantages as desired.

6. To provide a beehive construction, as aforesaid, which is feasible to mold from plastics material, if desired, or which can, if preferred, be made in a more conventional manner from wood.

Other objects and purposes of the invention will be apparent to persons acquainted with apparatus of this general type upon reading the following specification and inspection of the accompanying drawings.

BRIEF DESCRIPTION OF THE DRAWINGS

In the drawings:

FIG. 7 is an oblique view of the typical queen excluding adapter utilizable with the invention.

FIG. 8 is an elevation of a typical comb frame.

FIG. 9 is a side view of a further modified cover used with one embodiment of the invention, namely, when no inner cover is desired.

FIG. 10 is a section taken through the cover of FIG. 9 in a plane parallel to that of the comb frames.

FIG. 11 is an oblique bottom view of said cover of FIG. 9.

FIG. 12 is a view of a comb frame utilized for comb honey.

SUMMARY OF THE INVENTION

In summary, the invention comprises a plurality of generally triangular modules which can be arranged in a variety of specific relationships either with themselves or with conventional, as Langstroth, components to provide a wide number of specific hive arrangements. Typically, however, when said triangular modules are arranged solely with each other, they will be arranged in alternate orientation so that the vertical backs of each thereof are each independently accessible to the beekeeper for whatever inspection or handling is desired and same can be accomplished without movement, or other disturbance, of other modules or of the bees therein. Each of said modules comprises a pair of triangular ends connected by a panel so perforated as to permit the passage therethrough of hive occupants as desired, that is either to permit passage of both worker bees and queens or to permit passage only of workers according to the specific use in the hive of a given module. One side of each of said modules is closed by a removable imperforate door. Triangular comb frames are insertable into the modules through said sides after which said side may be closed by said door. The presence of the perforated panel in the bottommost module also ensures the exclusion of rodents or other vermin from the hive while still permitting the free ingress and egress of worker bees. The entire hive is mounted upon a suitable angular base which facilitates ventilation and the ejection from the hive of dead bees and other debris, as well as the drainage of condensed moisture.

DETAILED DESCRIPTION

Figure 1:
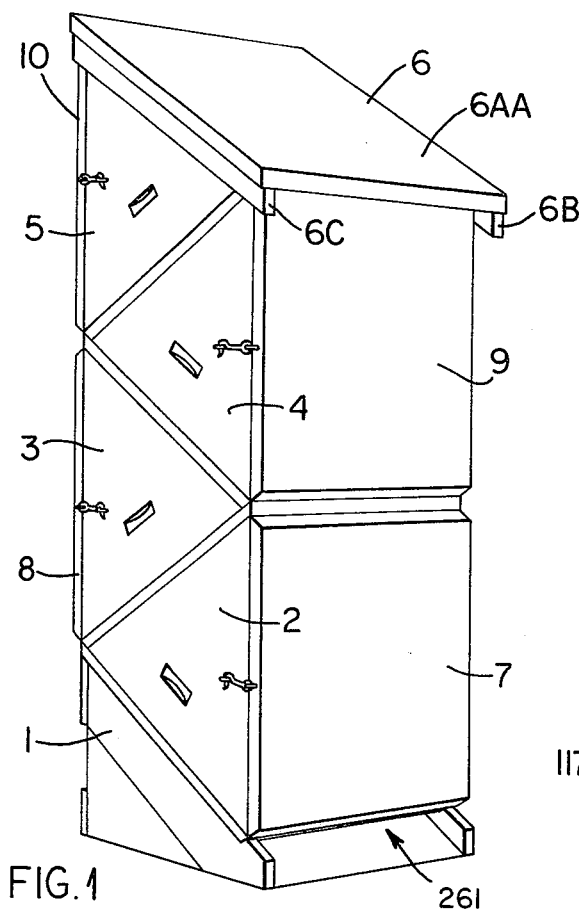
FIG. 1 is an oblique elevational view of a typical hive assembled from the components of the invention.

Referring now to the drawings and first to FIG. 1, there is shown a beehive assembly comprising a base 1 for hive body modules 2-5 and a cover 6. Each of the hive body modules is accessible by removable doors 7-10, respectively, and the cover is removable in a generally conventional manner.

Figure 3:
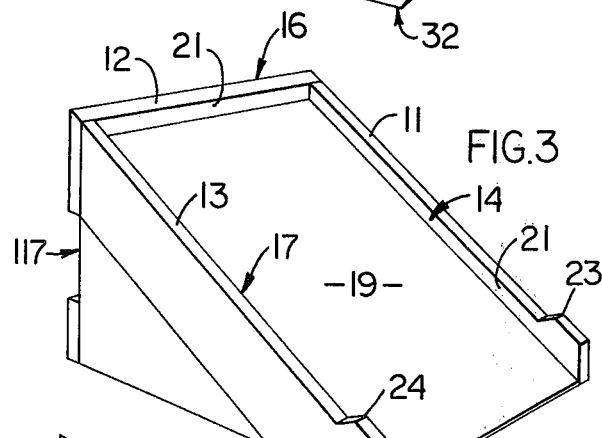
FIG. 3 is an oblique view of the base member of the hive of the invention.

Looking first at the base 1, attention is directed to FIG. 3, showing said base separate from the other components. The base is shown as constructed of wood but same can be made of other materials, such as molded plastics, if desired. The base consists of means providing three supporting surfaces 11, 12 and 13 which in this instance comprise the upper surfaces of boards 14, 16 and 17. Said boards are in turn supported by any conventional triangular base structure, generally indicated at 117. Other boards are arranged between said three last-named boards to provide a smooth surface 19. Said last-named surface together with the facing surfaces 21 of the boards 14, 16 and 17 provide an entryway passage for the bees into the hive. The first module 2 rests on the surfaces 11, 12 and 13 and is held in position thereon by any convenient means, such as the stop members 23 and 24.

Figure 2:
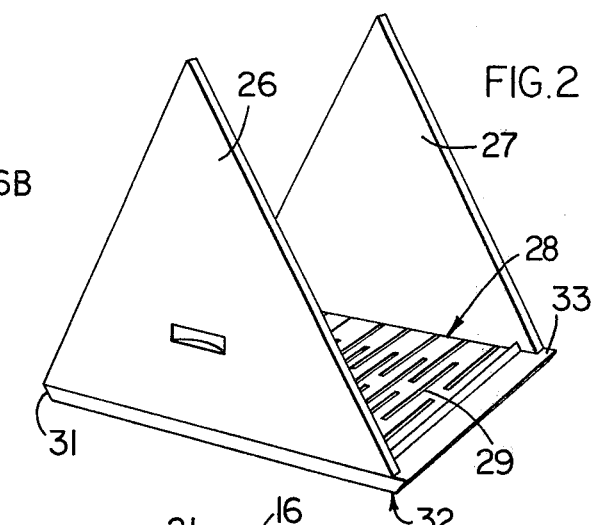
FIG. 2 is an oblique view of a hive body module from which the hive of the invention is assembled.

Turning now to FIG. 2, there is shown the hive body module which may be taken to be the module 2 of FIG. 1. The module consists of triangular end pieces 26 and 27, same being equilateral in this preferred embodiment, positioned parallel with respect to each other. A connecting panel 28 extends between said end pieces, is rigidly fixed to both thereof and includes a plurality of perforations 29. Said perforations may be in any form but are here shown as slots which are of such size as 5/16ths inch width, as to permit the passage therethrough of hive occupants while discouraging the building of bur comb therein. One corner 31 of said triangular ends is cut off for fitting smoothly against the ledges 23 and 24 of the base member and the other corner 32 is an extension of the panel 28 to provide a ledge or stop 33 for receiving and holding the next above-positioned module as the module 3.

All modules are preferably identical to facilitate their arrangement in a variety of patterns as desired.

The modules are here shown as of wooden construction but same may be readily modified to be molded from plastics. In such case, same will preferably be molded from any of many known types of foam plastics for obtaining light weight and may be provided with thinned sections and reinforcing ribs in a manner conventional for the design of foam plastics products, as indicated in FIG. 6, wherein the parts are identified with numerals corresponding to the numerals of FIGS. 1-5 but with the addition of the letter "A".

Figure 5:
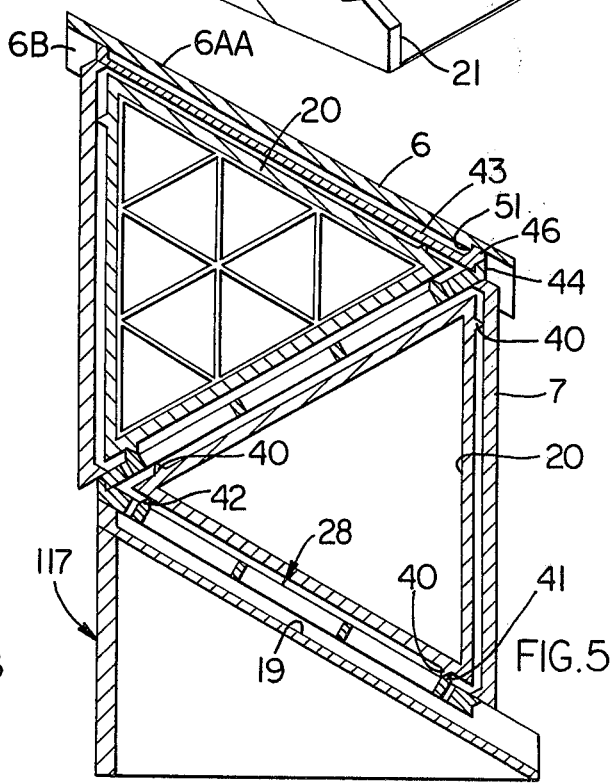
FIG. 5 is a section of a two-module assembly taken essentially therethrough in a plane parallel with the comb frames.
Figure 6:
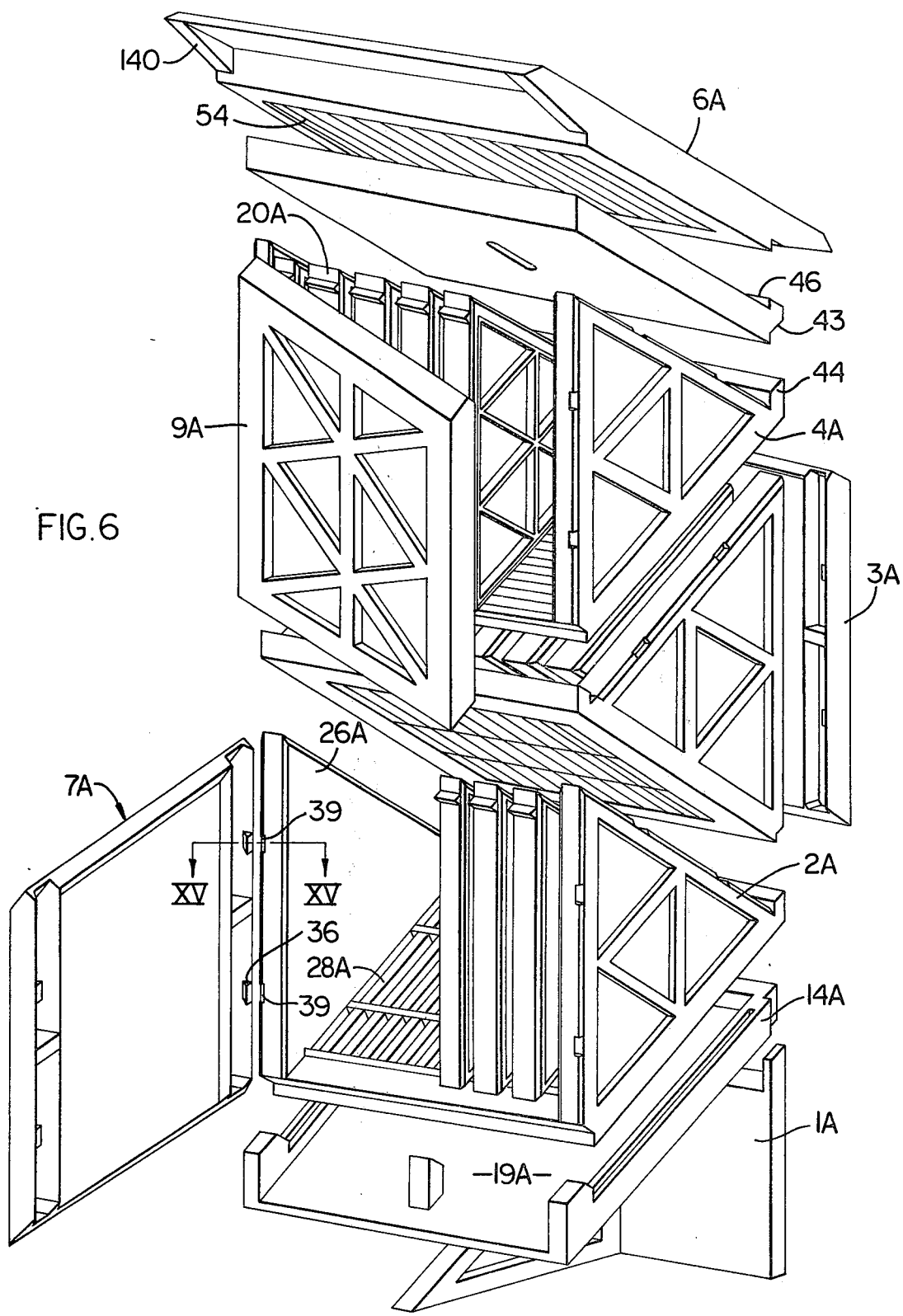
FIG. 6 is an exploded view of a hive similar to that of FIG. 1 but modified for making from plastics material and showing a modified cover.

As best shown in FIG. 6, said module is provided with a removable door 7A which in the plastics is accomplished by providing the door with projecting prongs 36 receivable into recesses 39. Said prongs are designed in any conventional manner to be snappable into position on the desired side of one of said modules but which can by application of a reasonable degree of withdrawing pressure be also snapped away therefrom. The details of such snapping arrangement are well known and hence need no further explanation here. Said doors may also be hinged and held in closed position by hooks if preferred, especially for the wooden form of FIGS. 1-5.

Figure 15:
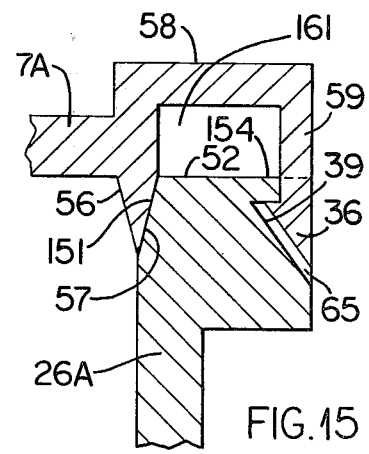
FIG. 15 is a sectional view taken on line XV—XV with, however, the parts in closed position.

FIG. 15 illustrates one desirable, but by no means the only, arrangement for the detailed relationship between a removable door 7A and the side member as the member 26A further identified as sections taken on the line XV—XV of FIG. 6 but showing the door 7A in a closed position.

Referring now to FIG. 15, the edge of the wall 26A is provided with a slanted corner 151, having an edge surface 52, means defining the notch 39 and a projecting portion 154. The door 7A has an inwardly projecting flange 56 provided with the surface 57 which engages the slanted corner 151 when same is in closed position and has a sidewardly projecting flange 58 supporting a projecting hook 59 for engaging said notch to hold the parts together. It will be clear from FIG. 15 that the parts are so dimensioned as to leave a space 161 when said parts are assembled. This prevents crushing of any bees which may be on the surface 52 as said parts are assembled. Said space 161 is open at its ends so that any bees caught therein can escape. Their actual contact points, namely the surfaces 151 and 57, together with the hook and notch above mentioned, will catch few if any bees inasmuch as they are not large and so shaped as to tend to wipe the bees off as the parts come together. Space 65 is provided to receive a standard hive tool for detaching the hook 59 and effecting opening of the door 7A.

While normally the hive will be closed at the top by a cover 6 as hereinafter described in further detail, it will be noted that a door similar to the door 7 may also be placed on the upper side of the uppermost module if preferred. This further illustrates the wide versatility in organization and arrangement possible with this type of hive.

The comb frames 20 are triangular as best shown in FIGS. 5, 8 and 12. The comb frames of FIGS. 5 and 8 are slotted longitudinally for the reception of comb in the same general manner as is conventional with Langstroth-type comb frames. They are substantially coextensive with the triangular, end members of the hive body module and are provided with protrusions 40 symmetrically arranged around each comb frame 20 for appropriately spacing such comb frame from the bottom member 28, from the door 7 and from the bottom of the next above module. This spacing, as is known, will preferably be of about 5/16ths inch in order to minimize the formation of bur comb and in general to provide the conventional bee space. The lowermost of the protrusions 40 also engage the stop member 41, which also functions as a spacer, and normally extends across the entire lower edge of the bottom member 28.

A further spacer 42 will be provided on the bottom member 28 near the other end thereof to effect proper spacing from said bottom member of the adjacent end of the comb frames 20. By this symmetrical construction of the comb frames, same can be rotated within their own planes whereby to change the edges appearing at the bottom of each thereof at a given time and thereby equalize any tendency for deterioration of the lower edge of the comb in each comb frame.

An inner cover 43, here of generally shallow pan-shaped contour, may be provided, if desired, for closing the upper side of the top module. Same is shaped to rest against the stop 44 of the said upper module 5 and itself is provided with a stop 46 for holding the cover 6.

A component similar to said inner cover may be perforated to permit passage of bees but not the queen and in such case may be used as a queen excluder between any two modules.

The cover 6 is of generally rectangular shape, comprises a panel 6AA and side flanges 6B and 6C, and preferably is provided with a depending flange 51 which latter comprises a stop means for resting against the stop 46 of the inner cover. Alternatively, the cover may be made as shown in FIG. 6 where the ends of the side flanges are tapered upwardly as at 140 to better clear the doors 7 as same are opened.

As a further feature, especially for plastics construction and which may be used with or independently of the slanted ends 140, said cover can also be provided with a plurality of depending flanges 54 (FIGS. 6, 10, 11) which will render the use of an inner cover unnecessary and will at the same time provide sufficient space for the bees as to inhibit swarming. As shown, the inner cover 43 will have essentially a surface-to-surface contact with the upper edges of the uppermost module and the cover 6 will have a similar surface-to-surface contact with the inner cover, all in a manner generally similar to corresponding components in the conventional Langstroth hive. However, if preferred, the cover may be mounted directly onto the upper edges of the uppermost module by means of the same construction as above described in connection with the doors 7 and 9 and illustrated in further detail in FIG. 15.

With this arrangement, there is provided a wide entrance at 261 for the ingress and egress of bees into and from the hive but the presence of the perforated panel 28 of the lowermost module will insure against entry into the hive of mice and/or other vermin. By the same token, any water which otherwise may enter the hive or occur by condensation therein readily runs out and the hive remains dry.

A comb frame for comb honey is shown in FIG. 12. It will be recognized that this may be assembled in any convenient manner into triangular frames 20A similar to the frames 20. They may be held therein and rendered individually removable therefrom merely by snug frictional insertion thereof into said frames 20A and may be individually removable therefrom as individual comb frames become filled. Likewise an entire frame 20A may be removed and replaced by a similar fresh one if and when desired in the same manner as combs for extracted honey are removed.

It will be further noted that although the frames 20A are shown as accommodating nine triangular comb sections, other numbers thereof such as four or sixteen may be utilized if preferred.

Note that in all forms of this beehive one or more frames may be at any time removed from any part thereof, the bees easily being blown out beforehand while the module is in place, and the frame or frames replaced by fresh frames. This cannot be accomplished in hives of the presently known construction except by an at least partial dismantling thereof.

Figure 13:
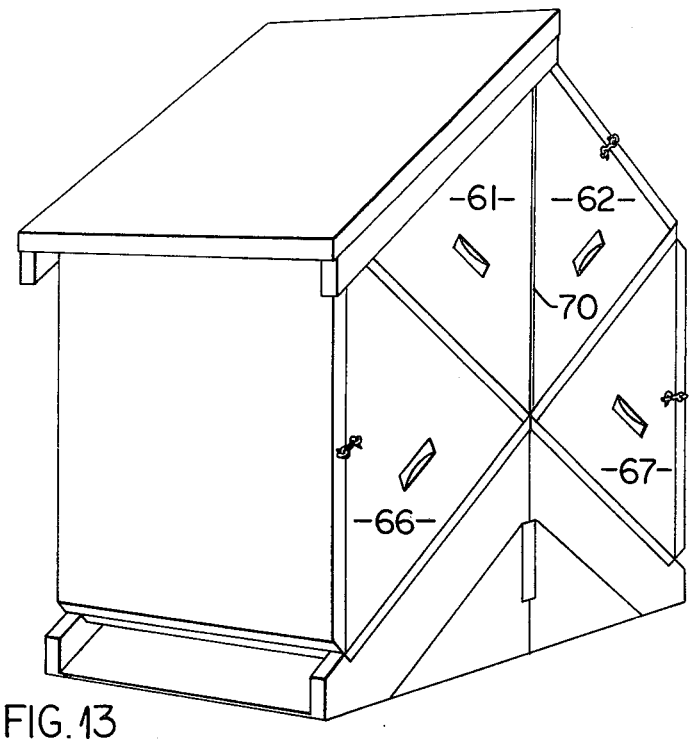
FIG. 13 is a modified arrangement of the modules comprising the invention.

FIG. 13 shows a different manner of assembling the triangular modules and illustrates the versatility of same. For this arrangement, an adapter 70 with perforations is preferably provided between the modules 61 and 62 to adjust bee space while permitting the passage of hive occupants therethrough. Said adapter 70 is generally similar to adapter 60 of FIG. 7 but with the fastening tabs 63 and 64 removed inasmuch as the hive components of FIG. 13 are of the wooden form and said tabs are used only with the plastic form. Other fastening means of any conventional type may be used with adapter 70 if desired.

Figure 4:
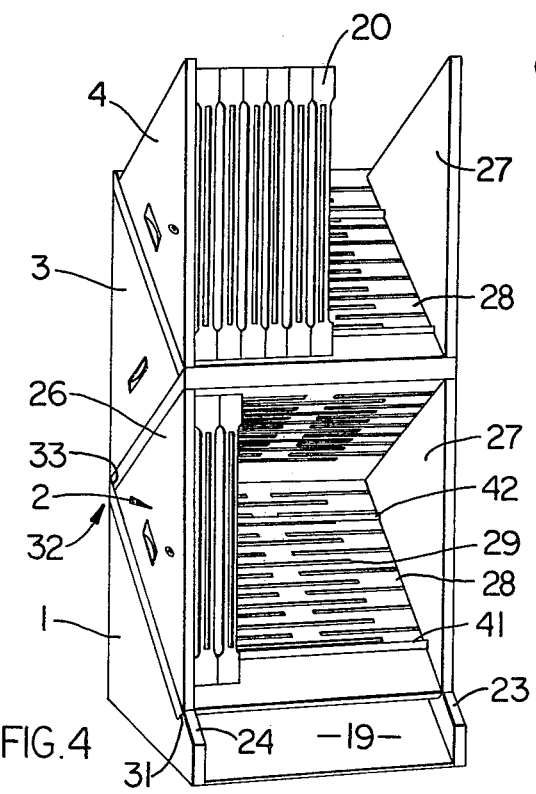
FIG. 4 is an oblique view of the hive of FIG. 1 partially disassembled to show the construction thereof and the manner of inserting comb frames.

The geometry of the components is such that in the arrangement shown in FIG. 13 the modules 61 and 62 will provide between the facing edges of the comb frames a spacing twice that normally provided when the modules are stacked as shown for example in FIGS. 4 and 5. Thus, if such spacing is, as it normally will be in FIGS. 4 and 5, 5/16ths of an inch, there will be 5/8ths of an inch of such spacing in the arrangement of FIG. 13. Thus, the adapter 70 is inserted between the modules 61 and 62, whereby to provide spacing between each set of such comb frames and the facing surface of the adapter which is the desired 5/16ths of an inch in accordance with known principles. This substantially or entirely prevents the building of bur comb while at the same time providing greater space for the bees whereby to minimize swarming tendencies. If desired, the adapter may be perforated so as to serve also as a queen excluder. This may be arranged for fastening to the hive body modules in any convenient manner, such as by providing prongs 63 and 64 the same as the prongs 59 on the closure panels 7A and 9A for reception into the notches 39 (FIG. 6). This arrangement may be used for example where the modules 66 and 61 are both brood units whereas the modules 67 and 62 are for the collection of recoverable honey. This arrangement provides a four unit hive with two entrances without stacking the parts as high as is required in the arrangement shown in FIG. 1.

Figure 14:
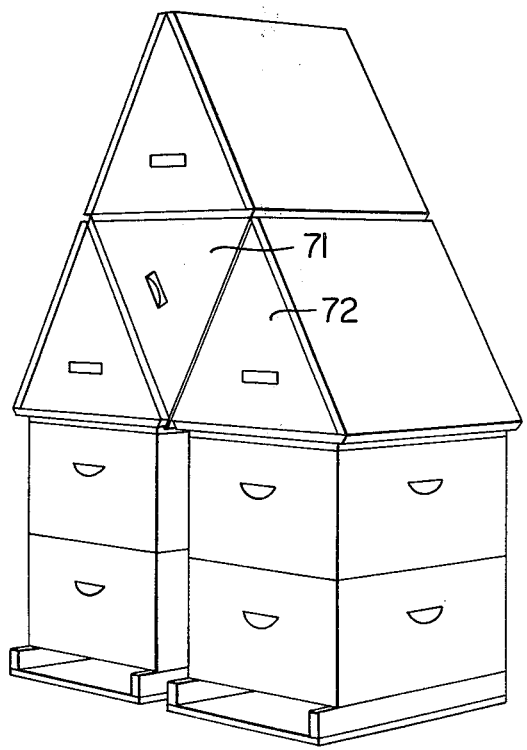
FIG. 14 is one possible arrangement of the modules of the invention together with conventional hive bodies from a Langstroth-type hive.

FIG. 14 shows schematically one arrangement wherein the modules of the present invention are used in association with hive bodies and queen excluders of the conventional Langstroth type. In this instance, one adapter as shown in FIG. 10 will normally be required between modules 71 and 72 to effect proper spacing of the parts and this may be of a queen-passing or queen-excluding type as desired according to the hive arrangement chosen by the beekeeper. By using queen excluders at the top of the rectangular hive bodies, the rectangular hive bodies will be used as brood chambers and all four triangular hive bodies of the invention will be available for the collection of recoverable honey. Other arrangements are obviously possible and will be limited only by the ingenuity of the beekeeper. More or less of said units may be utilized as brood chambers as desired and likewise more or less thereof may be utilized for the collection of honey according to the climate, the availability of honey, and the desires and purposes of the beekeeper.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property of privilege is claimed are defined as follows:

1. A stackable module, for a beehive construction of the kind having a support and means for covering a module supported by said support, said module being substantially of triangular prism shape and comprising:
   a pair of spaced, opposed, substantially parallel triangular end members defining the ends of said prism;
   a panel connecting said triangular end members and defining a first face of said prism, said panel being perforated for entry of hive occupants into said module, said perforated panel having opposite first and second edges adjacent said triangular end members;
   a removable door panel defining a second face of said prism, said module being open at the third face of said prism;
   whereby ones of said modules are stackable to form a beehive construction, with the open face of one facing said perforated panel of the next and a said perforated panel disposed between said support and cover means and accessible to bees from outside the hive, and with said door panels exposed for ready human access into said modules.

2. The device of claim 1 including a projecting stop substantially adjacent a third edge of said perforate panel connecting said first and second edges.

3. The device of claim 2 wherein said stop extends the full width of said perforate panel and is located substantially at said third edge thereof.

4. The device of claim 2 wherein vertices of said triangular end members lie adjacent a fourth edge of said perforated panel opposite said stop, which fourth edge is beveled in such a manner that when one of said modules is placed in superposed register with another thereof, the beveled fourth edge of the uppermost of said modules will rest snugly against the stop of the next lower of said modules.

5. The device of claim 1 wherein the perforations of said perforated panel are of such size as to permit the free passage of worker bees therethrough but prevent the passage of the queen bee therethrough.

6. The device of claim 1 including members fixed to said perforated panel providing at least two ridges extending thereacross inside the module for support and positioning of comb frames thereon.

7. The device of claim 1 including triangular comb frames positioned within said module, same being aligned in planes parallel to the plane of said triangular members.

8. The device of claim 7 including also means spacing each of said comb frames a selected distance from said perforated panel.

9. In a beehive construction, the combination comprising:
   a hive module shaped substantially as a triangular prism and including a perforated, generally rectangular panel defining one face of said prism, said panel having opposite parallel edges, a pair of triangular end members of the same size and shape affixed substantially at right angles to said perforated panel respectively adjacent one of said parallel edges and defining the ends of said prism, and a door defining a second side of said prism, said module being open at the third side of said prism;
   means for covering the open face of said module; and
   a base having an upwardly facing angularly positioned surface and three flanges projecting upwardly beyond said surface at the ends and upper side thereof;
   stop means adjacent the lower side of said surface;
   the whole being so dimensioned as to receive on said flanges the lower surface of a said perforated panel to define a passageway for the exit and entry of bees through the perforations in said panel with respect to said module, said module resting against said stop means for maintaining same in a predetermined position on and with respect to said base.

10. The device of claim 1 including triangular comb frames positioned within said module, same being aligned in planes parallel to the plane of said triangular members and means spacing each of said comb frames a selected distance from said perforated panel;
    and further spacers providing selected spacing between said comb frames and the next upwardly placed module and between said comb frames and the adjacent removable door panel.

11. The device of claim 10 wherein said spacers are positioned on said comb frames.

12. The device of claim 1, wherein an outwardly facing edge surface of a said triangular member has a beveled surface along one corner thereof and has an undercut notch adjacent the other corner thereof and wherein said removable door panel is provided with an angular surface for mating with said beveled surface and a hook for engaging said notch whereby said beveled surface and said angular surface provide the whole bearing support between said removable cover and said triangular member, and said hook and notch relationship holds said removable door and said triangular member in bearing relationship against said surfaces.

13. The device of claim 12 wherein said outwardly facing edge surface of said triangular member and the opposed inner surface of said door panel are spaced apart sufficiently to accommodate bees therebetween without crushing same.

14. In beehive construction, a hive constructed from a plurality of identical triangularly prismatic shaped modules, each of said modules comprising a perforated panel and a pair of imperforate side members together with a removable inperforate door affixed between said pair of side members; and
   said modules being stacked with respect to each other so that an open side of one thereof faces against the perforated panel of another thereof and the sides carrying removable doors are each accessible without disturbing another module, the hive including first means for covering the exposed open side of the module at one end of the stack of modules and second means located at the other end of said stack for allowing a bee to gain entrance to the hive, and support means for said stack adjacent one of said first and second means.

15. In beehive construction, a hive constructed from a plurality of identical triangularly prismatic shaped modules, each of said modules comprising a perforated panel and a pair of imperforate side members together with a removable imperforate door affixed between said pair of side members;

said modules being stacked with respect to each other so that an open side of one thereof faces against said perforated panel of another thereof and said removable doors are each accessible without disturbing another module;

a triangularly prismatic channeled base member including means defining a channel on the upper side thereof for association with and support of the side of the lowermost of said modules having said perforated panel thereon and a cover closing the upper open side of the uppermost of said modules.

16. The device of claim 14 in which said modules include stop means between respectively adjacent modules for preventing relative motion therebetween when same are in stacked condition.

17. The device of claim 1 wherein each of said triangular end members is an equilateral triangle and wherein said perforated panel has opposite third and fourth edges transverse to said triangular end members, one of which third and fourth edges projecting beyond said triangular end members a distance equal to the thickness of said perforated panel.

18. The device defined in claim 17 wherein said third and fourth edges of said perforated panel are tapered covergingly with respect to each other from the surface of said perforated panel which is inward of said module, said third and fourth edges being tapered at angles of substantially 60° with respect to said surface.

* * * * *